United States Patent [19]

Ruoff

[11] E Re. 28,574

[45] Reissued Oct. 21, 1975

[54] FIBER REINFORCED HOT PRESSING MOLDS

[75] Inventor: Werner H. Ruoff, Berea, Ohio

[73] Assignee: Union Carbide Corporation, New York, N.Y.

[22] Filed: Dec. 17, 1971

[21] Appl. No.: 209,480

Related U.S. Patent Documents

Reissue of:

[64] Patent No.: 3,556,893
Issued: Jan. 19, 1971
Appl. No.: 690,888
Filed: Dec. 15, 1967

[52] U.S. Cl. ..... 425/78; 249/134; 156/172

[51] Int. Cl. ..... B65h 81/00

[58] Field of Search..... 425/77, 444, 445, 452–455, 425/352–355, 78; 156/172, 185, 187; 264/519, 219, 330, 337; 249/134, 135

[56] References Cited

UNITED STATES PATENTS

| | | | |
|---|---|---|---|
| 2,594,693 | 4/1952 | Smith | 156/172 X |
| 3,414,460 | 12/1968 | Hassert et al. | 156/172 X |
| 3,444,019 | 5/1969 | Van Leeuwen | 156/172 X |
| 3,457,963 | 7/1969 | Hardwick | 156/172 X |
| 3,461,506 | 8/1969 | Rice et al. | 249/134 X |
| 3,461,507 | 8/1969 | Rice | 249/134 X |

*Primary Examiner*—J. M. Meister
*Attorney, Agent, or Firm*—I. Blum

[57] ABSTRACT

[A method for reinforcing a refractory mold by wrapping a carbonaceous textile material around the surface of the mold. The textile material may be coated with a binder and the assembly subsequently baked to a temperature sufficient to coke the binder in order to reinforce and mechanically link the textile material] *A fiber reinforced hot pressing mold composed of a conventional refractory mold encased by a carbonaceous textile material. The textile material is coated with a binder prior to, or subsequent to, being wrapped around the surface of the mold and then the mold assembly so prepared is baked to a temperature sufficient to coke the binder in order to reinforce and mechanically link the textile material.*

12 Claims, 2 Drawing Figures

Figure 1:
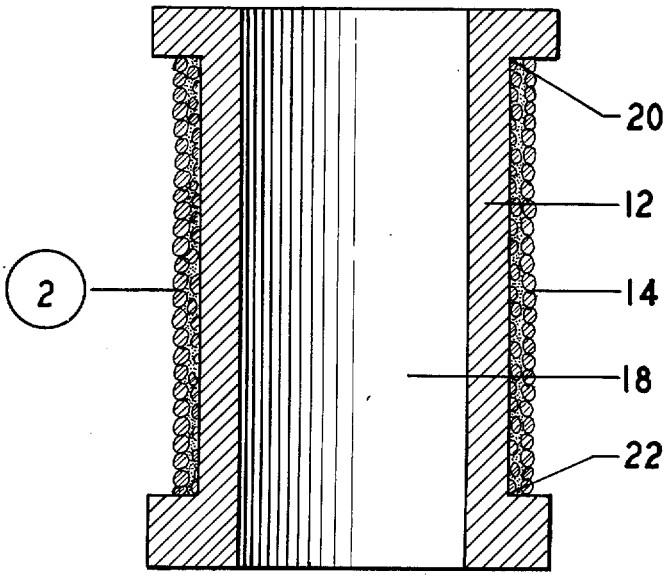

INVENTOR
WERNER H. RUOFF
BY
ATTORNEY

FIBER REINFORCED HOT PRESSING MOLDS

Matter enclosed in heavy brackets [ ] appears in the original patent but forms no part of this reissue specification; matter printed in italics indicates the additions made by reissue.

FIELD OF THE INVENTION

This invention relates to a method of constructing a mold having a superior strength. More specifically, it relates to a method of reinforcing a graphite mold to withstand greater internal pressures.

DESCRIPTION OF THE PRIOR ART

Due to its excellent thermal properties, graphite has long been employed as a refractory material in a wide variety of applications. In one particular application, it is quite useful as a mold for the high temperature fabrication of numerous products, such as beryllium billets. However, due to its inherently low tensile strength, graphite, when formed into a mold, cannot withstand extremely high pressures and thus its effectiveness is accordingly reduced. Of course, the wall thickness of the graphite mold can be increased but the increase in tensile strength is not directly proportional to the increase in wall thickness. Thus, a wall thickness of almost 15 inches of monolithic graphite is required if an internal pressure of 2200 p.s.i. is generated within the mold.

Metal reinforcing hoops have been suggested for use in strengthening the graphite mold, but are disadvantageous for several reasons. High [allow] *alloy* metals would be required but because of the characteristic decreasing creep resistance with increasing temperature in these metals, extreme stress could not be endured. For example, at 1500°F., the allowable stress on high alloy steel is only one thousand pounds per square inch. Thus, even in this low temperature range, little support would be supplied to the graphite mold and at the higher operating temperatures, metal reinforcement equipment would be virtually ineffective. In addition, high alloy metals have a rate of thermal expansion which is between two and one half to four times the thermal expansion of graphite. Therefore, maintaining a proper fit between the graphite mold and the metal reinforcing elements over the operating temperatures of the system would be a difficult task.

SUMMARY OF THE INVENTION

Broadly, these disadvantages are overcome by the method of the invention which comprises wrapping a textile material around a refractory mold, preferably a graphite mold, until a substantial portion of the surface of the mold is covered thereby. The textile material is generally under some tension when being applied to the mold surface in order to facilitate the wrapping or winding procedure. Excellent results are achieved when a carbonaceous yarn is employed, although cloth and tape are also suitable. In the preferred embodiment, a binder is applied to the textile material to facilitate adherence to the mold. The binder is subsequently coked to provide mechanical linkage at high temperatures and to ensure a minimum of damage if a part of the textile is torn during handling or use.

Manufactured carbonaceous materials which possess all of the unique mechanical, electrical and chemical properties of natural carbonaceous materials have recently become commercially available in the form of textile materials such as yarns and cloths. These materials possess the character of carbonaceous materials as well as the attributes of textile materials such as drape and hand.

United States Patent 3,011,981, issued Dec. 5, 1961 to W. T. Soltes, discloses a method for manufacturing textile carbon by the thermal conversion of fibrous and substantially pure cellulosic materials, such as strands, skeins, ropes, cloths, fabrics and batting pads. The textile carbon product is stated to be electrically conductive while retaining the flexibility and other physical characteristics of the textile starting material.

Electrically conductive graphite in a flexible fiber and fabric form is reported in Metal Progress, May 1959, pp. 115–116, and in United States Patent 3,107,152 issued to Ford et al.

It has been discovered that a remarkable increase in mold strength is achieved when a material of the type above-described is used to reinforce the mold. Since the textile material is carbonaceous in character, it will expand at the same rate as the graphite mold as the temperature of the system is increased. In addition, the tensile strength of graphite yarn plus carbonized binder is approximately 13,500 pounds per square inch and is relatively constant from 100°F. to 4000°F., thus avoiding the problems associated with metal reinforcing elements as hereinbefore described.

Figure 2:
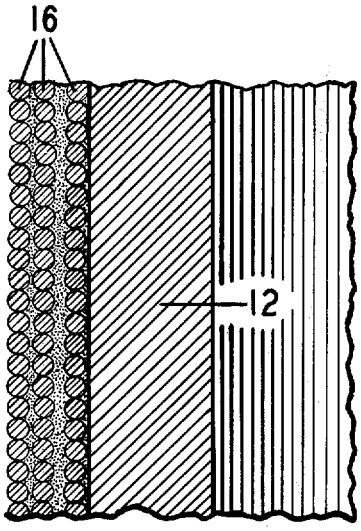

The invention will be described in greater detail by referring to the drawing wherein FIG. 1 is a vertical, cross-sectional view of graphite mold with a reinforcing yarn-binder composite wrapped about the surface of the fold, and FIG. 2 is a greatly enlarged fragmentary view of a portion of the apparatus of FIG. 1.

Referring now to the drawing, a fiber reinforced mold assembly designated generally by the numeral 10 comprises a graphite mold 12 and a textile-binder composite 14. The composite 14 is composed of a plurality of carbonaceous textile yarn strands 16 and a resin binder as shown in FIG. 2. The mold 12 which is provided with a cavity 18 is recessed at its outer surface about its periphery in the area extending from points 20 to 22. The recess ensures the proper positioning of the graphite textile material.

The textile material can be affixed to the surface of the mold in a variety of ways. For example, the mold can be mounted on a lathe or a filament winding machine and rotated while the textile material is held under slight tension in contact with the rotating surface. In order to avoid weak segments, care should be taken to ensure that the textile is wrapped so as to cover the entire surface of the recess or, if no recess is employed, substantially all of the surface about stressed portion of the mold.

In has been further discovered that there is a direct relationship between the thickness of the textile material covering the mold and the amount of internal pressure which the mold can withstand. If a 10 poly carbonaceous yarn is used as the textile material, the composite thickness (inches)=Fm/13,500 p.s.i., where:

$$Fm = \frac{\text{inside diameter of mold (inches)} \times \text{pressure to be withstood by textile}}{2}$$

While this formula is applicable to fairly accurately design the strength of the mold with the use of 10 ply yarn and a resin binder, it is also appropriate when other textile material such as textile cloth and tape are employed. Of course, it will be appreciated that both cloth and tape are weaker than yarn initially and, therefore, an allowance for the difference should be made. The above formula should be modified for cloth, tape or any other suitable textile material by ascertaining the tensile strength of the material and substituting that number for the 13,500 p.s.i. appearing in the above equation. The tensile strength of many carbonaceous textile forms are well known or can readily be calculated or empirically determined by one skilled in the art with or without a coked binder.

It should further be noted that the entire pressure which the mold will withstand is the sum of the mold wall and textile resistances. Thus, the wall thickness of the mold will indirectly determine the thickness of textile to apply in as much as the mold wall pressure resistance is directly related thereto.

The binder is applied to the carbonaceous textile material in order to reinforce and mechanically link the textile material itself, particularly if in the form of a yarn. The binder is suitably a thermosetting carbonaceous resin and is preferably applied to the texile material before it is placed on the surface of the mold in order to assure that each layer of textile material is coated therewith. The binder can be applied to the outer layer of textile material after it is affixed to the mold but the adherence of the first layer to the mold wall will be accordingly reduced. Satisfactory binders include phenolformaldehyde resins, epoxy resins and many other cements, preferably with a high coking value.

The binder may be applied in any suitable manner such as by forming a liquid bath thereof and passing the textile material through the bath. Alternatively, coating of the textile material can be accomplished by spraying, painting, and the like. It is prefered that the textile material be saturated or soaked with the binder until impregnation occurs, but simply providing a surface coating is also quite satisfactory.

The following example is illustrative of the method of the invention.

EXAMPLE

A graphite mold having the general configuration as that shown in the drawing was mounted on a lathe for rotation. The mold was 50 inches long with an outside diameter of 11 inches and an inside diameter of 8½ inches. A recess of ¾ inch was machined into the surface of the mold from a point 13 inches from the top of the mold to a point 13 inches from the bottom of the mold. 10 ply graphite yarn was saturated with a binder composed of four parts epoxy resin to one part trimelticanhydride hardener by passing the yarn through a bath of the resin binder. The bath was diluted with acetone to render it fluid enough, i.e., a brushable consistency. After saturation, the yarn was passed through a tensioning device to provide a constant tensional force of ¾ lb. while the yarn was wound on the rotating mold. The saturated yarn was wound in tight parallel layers to a thickness of 0.7 inch. The assembly was then dried in air at room temperature for twelve hours to remove the acetone. Heating in an oven at 100° C. for four hours to cure the resin binder was followed by baking at 850° C. until the binder was coked.

Subsequent to the above procedure, the assembly was then subjected to a hydraulic internal pressure and the mold failed at a pressure of 2200 p.s.i. which is almost exactly the predicted failure pressure when calculated by the formula hereinabove set forth.

It will be appreciated that the method of the invention is applicable to all existing graphite molds without the need for special redesign efforts. In addition, there are no temperature control problems during operation as there would be if metal reinforcement members were employed. Results show that presently a 50 inch diameter graphite mold is required to hot press a 23 inch diameter beryllium plug while if processed in accordance with the teachings of this invention, a 28 inch diameter mold with twenty to thirty layers of yarn would be adequate.

What is claimed is:

1. A method for reinforcing a refractory mold comprising:

(a) applying a thermosetting carbonaceous binder to at least one side of a flexible textile material selected from the group consisting of carbon yarn, graphite yarn, carbon cloth, graphite cloth, carbon tape and graphite tape, said carbonaceous binder being capable of coking at high temperatures so as to provide a mechanical linkage for the textile materials;

(b) wrapping at least one layer of said textile material substantially around the outside surface of the refractory mold; and (c) heating said mold, said textile material and said binder to a temperature sufficient to cure and coke said binder.

2. The method as in claim 1 wherein said carbonaceous binder is selected from at least one of the groups consisting of phenol-formaldehyde resins and epoxy resins, and wherein the step of providing a recess about the periphery of the mold is carried out prior to the winding of the textile material thereon.

3. The method as in claim 1 wherein said wrapping is carried out by rotating said mold while simultaneously wrapping the textile material on the outside of the mold.

4. The method of claim 1 wherein the textile material is subjected to a tensional force while being wrapped about the surface of the refractory mold.

5. The method of claim 1 wherein an additional heating step is added between steps (b) and (c) to cure said binder.

*6. A method of producing a reinforced refractory mold comprising the steps of:*

*(a) wrapping a flexible textile material around a refractory mold, said material selected from the group consisting of carbon yarn, graphite yarn, carbon cloth, graphite cloth, carbon tape and graphite tape;*

*(b) inducing a compressional pre-load into the mold wall; and*

*(c) bonding said textile material to the mold.*

*7. A reinforced refractory mold comprising an inner refractory mold encased by a flexible textile material wound around the inner mold and bound thereto by a binder, said flexible textile material selected from the*

*group consisting of carbon yarn, graphite yarn, carbon cloth, graphite cloth, carbon tape and graphite tape.*

*8. A reinforced mold as set forth in claim 7 wherein said flexible textile material is tensionally wound around said mold.*

*9. A high strength hot-press mold comprising an inner graphite mold encased by a high strength graphite fiber wound around the inner mold and bound thereto by a binder.*

*10. A mold as set forth in claim 9 wherein said graphite*

*fiber is tensionally wound to induce a compressional pre-load into the mold wall.*

*11. A mold as set forth in claim 10 wherein said binder is phenol-formaldehyde resin.*

*12. A method of producing a high strength hot-press mold which method comprises: wrapping high strength graphite fibers around an inner graphite mold; inducing a compressional pre-load into the mold wall and bonding the fibers to the mold wall.*

* * * * *